(12) United States Patent
Dedieu et al.

(10) Patent No.: US 7,792,313 B2
(45) Date of Patent: Sep. 7, 2010

(54) HIGH PRECISION BEAMSTEERER BASED ON FIXED BEAMFORMING APPROACH BEAMPATTERNS

(75) Inventors: Stephane Dedieu, Ottawa (CA); Philippe Moquin, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1313 days.

(21) Appl. No.: 11/075,811

(22) Filed: Mar. 10, 2005

(65) Prior Publication Data

US 2005/0201204 A1    Sep. 15, 2005

(30) Foreign Application Priority Data

Mar. 11, 2004    (GB) .................. 0405455.7

(51) Int. Cl.
H04R 3/00    (2006.01)

(52) U.S. Cl. ................. 381/92; 381/56; 367/119

(58) Field of Classification Search ............ 381/92, 381/56, 91, 122; 367/118, 119, 120, 121, 367/122, 123
See application file for complete search history.

(56) References Cited

U.S. PATENT DOCUMENTS

| | | | |
|---|---|---|---|
| 4,802,227 A | 1/1989 | Elko | |
| 5,526,433 A | 6/1996 | Zakavauskas et al. | |
| 5,581,620 A | 12/1996 | Branstein et al. | |
| 5,686,957 A | 11/1997 | Baker | |
| 5,742,693 A * | 4/1998 | Elko | 381/92 |
| 5,778,082 A | 7/1998 | Chu et al. | |
| 5,825,898 A | 10/1998 | Marash | |
| 6,178,248 B1 | 1/2001 | Marash | |
| 6,243,471 B1 * | 6/2001 | Brandstein et al. | 381/92 |
| 6,469,732 B1 * | 10/2002 | Chang et al. | 348/14.08 |
| 6,473,362 B1 * | 10/2002 | Gabbay | 367/119 |
| 6,584,203 B2 * | 6/2003 | Elko et al. | 381/92 |
| 6,594,367 B1 * | 7/2003 | Marash et al. | 381/92 |
| 7,366,308 B1 * | 4/2008 | Kock | 381/92 |
| 7,394,907 B2 * | 7/2008 | Tashev | 381/92 |
| 2003/0051532 A1 | 3/2003 | Beaucoup et al. | |
| 2003/0081504 A1 | 5/2003 | McCaskill | |

FOREIGN PATENT DOCUMENTS

| | | |
|---|---|---|
| EP | 0742679 A2 | 11/1996 |
| EP | 1 286 175 A2 | 2/2003 |
| JP | 56150370 A | 11/1981 |

OTHER PUBLICATIONS

Tracking of coherent broadband sources using adaptive directional filter with maximally flat responses at nuell directions; Signal Processing 55 (1996) 31-54.

(Continued)

*Primary Examiner*—Vivian Chin
*Assistant Examiner*—Jason R Kurr (57) ABSTRACT

A beamsteerer for broadband energy source location, comprising an array of sensors, each for generating a signal vector within one of a plurality of sectors in a domain of interest, and a beamformer for receiving and multiplying each signal vector by a set of optimal weight vectors to generate a plurality of beampatterns, each of the beampatterns being characterized by a null having high angular resolution, and detecting the source by selecting a maximum steering index.

16 Claims, 8 Drawing Sheets

OTHER PUBLICATIONS

EU Search Rpt 05251419.7, Dec. 7, 2006, Dedieu et al.

Strobel et al. "Joint Audio-Video Signal Processing for Object Localization and Tracking", Microphone Arrays, 2001, pp. 203-225; Springer, Berlin/Germany.

Arslan et al. "A Unified Neural-Network-Based Speaker Localization Technique" IEEE Transactions on Neural Networks; vol. 11, No. 4, Jul. 2000, pp. 997-1002.

Karmanci et al. "Relationship Between Adaptive Minimum Variance Beamforming & Optimal Source Localization" IEEE Transactions on Signal Processing; vol. 48 No. 1, Jan. 2000 pp. 1-12.

Yuang et al. "Real-Time Passive Source Localization: A Practical Linear-Correction Least-Squares Approach" IEEE Transactions on Speech & Audio Processing vol. 9 No. 8 Nov. 2001.

* cited by examiner

HIGH PRECISION BEAMSTEERER BASED ON FIXED BEAMFORMING APPROACH BEAMPATTERNS

FIELD OF THE INVENTION

The invention relates generally to sensor arrays, and more particularly to a beamsteerer for high precision, broadband sound source location in an audio-video conference system, which ignores sound reflections off of walls.

BACKGROUND OF THE INVENTION

Estimating the bearing of a source is a problem for applications such as passive sonar (in underwater antenna alignment) and in video conferencing (speaker location). The use of sensor arrays is well known in the art for addressing this problem. In one approach, the array information is used to synthesize a beam that is aimed at various points in a domain of interest. An estimate of the source location is derived from the point of maximum received energy.

N. Strobel, S. Spors & R Rabenstein "*Joint Audio-Video Signal Processing for Object Localization and Tracking*", Chapter 10 in Microphone Arrays by Branstein & Ward, Springer, 2001, discusses a number of sophisticated methods for sound source location according to the prior art.

Guner Arslan and F. Ayhan Sakarya, "*A Unified Neural Networks Based Speaker Localization Technique*", IEEE Transaction on Neural Networks, Vol. 11 no 4 July 2000, sets forth a neural network to generate a source location estimate based on a maximum energy search.

Kerri Harmonic, Joseph Tabriakan and Jeffrey L. Krolik: "*Relationships Between Adaptive Minimum Variance Beamforming and Optimal Source Localization*", IEEE Transaction on Signal Processing, Vol. 48, no 1 January 2000, discloses adaptive minimum variance beam forming for source localization.

Zakavauskas (U.S. Pat. No. 5,526,433) teaches the use of a plurality of microphones to aim a highly directional microphone based on differences between the signals from the microphones emanating from the selected source. As with the approaches set forth above, source location is based on a maximum energy search.

Beaucoup and Tetelbaum (U.S. Patent Application 2003/0051532A1) also discloses a talker localization system that is based on maximum energy. To deal with reverberation, an energy history is retained to determine when a new signal starts thereby permitting reliable detection of the direct path.

There are two principal disadvantages of prior art sound localization systems, as set forth above. Firstly it is very difficult to create a main beam with a very narrow beam angle, giving rise to expensive solutions in order to achieve high resolution. Secondly, such highly directional beam patterns are generally accompanied by significant side lobes, which can lead to erroneous look directions. Stated otherwise, a simple beamformer (in free field or in an obstacle) is characterized by multiple side lobes and a limited beam width depending on the geometry of the array and the number of microphones. A source locator based on such a beamformer cannot efficiently discriminate side reflections.

Baker (U.S. Pat. No. 5,686,957) sets forth a multi-microphone system for detecting the source based on the loudest microphone output. For an effective system, each participant requires a microphone. Because the audio detection mechanism is limited in its ability to detect sound, a special camera is used to enhance the peripheral portion of the field of view.

Another prior art approach to estimating source location involves measuring the time delay of arrival (TDOA) between sensor pairs. The major difficulties in these systems are that there is a need for very accurate knowledge of the position of the sensors, and the sensors must be spaced apart by a significant distance to obtain a reasonable time delay from one sensor to another.

Yiteng Huang, Jacob Benesty, G. Elko and Russell M. Mersereau: "*Real-time Passive Source Localisation: A Practical Linear-Correction Least-Squares Approach*", IEEE Transactions on Speech and Audio Processing, Vol. 9, no 8, November 2001, provides a good survey of the state of the art in TDOA-based source localization. Huang et al also disclose a system used for speech that is fairly robust against errors, but is large in that it spans 0.8×0.8 m.

Chu (U.S. Pat. No. 5,778,082) determines the location of a speaker by a cross-correlation method, which improves the source detection in a reverberant environment.

Branstein (U.S. Pat. No. 5,581,620) teaches a method for location of a speaker by using of the phase alignment of the input signals. However, this approach requires intensive computation and a large array.

In both Chu and Branstein, the strongest signal is typically sought out. In instances where there are strong echoes it is possible to make an erroneous detection. The beam width possible with a limited number of transducers is restricted. Conventionally, the directivity of an array is proportional to the number of elements in the array. This problem is somewhat overcome with TDOA systems but in order to obtain a good estimation, the sensors must be spatially separated so that a significant portion of the wavelength separates them. These devices are also critically affected by phase and amplitude errors.

SUMMARY OF THE INVENTION

According to the present invention, a beamsteerer is provided for steering a narrow null toward a domain of interest. The lowest energy point corresponds to the location of a source of audio. The beamsteerer uses an array of only a few sensors that are compact, and provides a null with high angular resolution and reasonable error robustness (e.g. a resolution finer than 5 degrees).

According to the preferred embodiment, the array is configured with an optimal geometry for generating specific 3D beam patterns each having a unique and deep null in the domain of interest for unambiguously detecting a source azimuth and latitude. The array can be in free field, over a rigid plane (e.g. wall) or embedded in a small obstacle, allowing a unique null on a broad frequency band in the direction of the domain of interest, (i.e. where the source to be detected is).

An algorithm and a specific array design are set forth, by which specific beam patterns are created, allowing an accurate detection of the main source while rejecting side reflections of sound off of walls, etc. Specifically, a beamformer is provided having several look directions, with a constraint imposed and an array geometry and microphone configuration to create the unique null.

The characteristic size of the array (ka) is used to describe the behaviour through this disclosure. It is defined as follows: k is the wavenumber=$2\pi/\lambda$ where $\lambda$ is the wavelength of interest and a is the characteristic radius of the array. For a circular array this is the actual radius of the array.

BRIEF DESCRIPTION OF THE DRAWINGS

Embodiments of the present invention will now be described more fully with reference to the accompanying drawings, in which:

FIG. 5 shows unique null beam patterns steered in the plane XOY at two different angles, 30 degrees (FIG. 5A) and 70 degrees (FIG. 5B), for the microphone array of FIG. 4.

FIG. 10 is a $\log_{10}(SI)$ graph for two sources at 35 degrees (FIG. 10A) and 90 degrees (FIG. 10B) at 1 meter from the center of the array of FIG. 4 with ideal microphones.

FIG. 11 is a $\log_{10}(SI)$ graph for two sources at 35 degrees (FIG. 11A) and 90 degrees (FIG. 11B) at 1 meter from the center of the array of FIG. 4, and microphones with errors of about 8 degrees in phase and +/−1 dB.

DETAILED DESCRIPTION OF THE PREFERRED EMBODIMENT

I. Microphone Configuration

In the preferred embodiment, the frequency range of operation is between 1000-1500 Hz in air (wavelength: 0.22<λ<0.35 m) although this can be extended. This frequency range is chosen for detecting speech and is based on the following considerations:

1. The background noise level diminishes with frequency.
2. The speech intelligibility is reasonably important in this band.
3. Reverberation also diminishes with frequency although it is important in the low end of the chosen interval.

Figure 1:
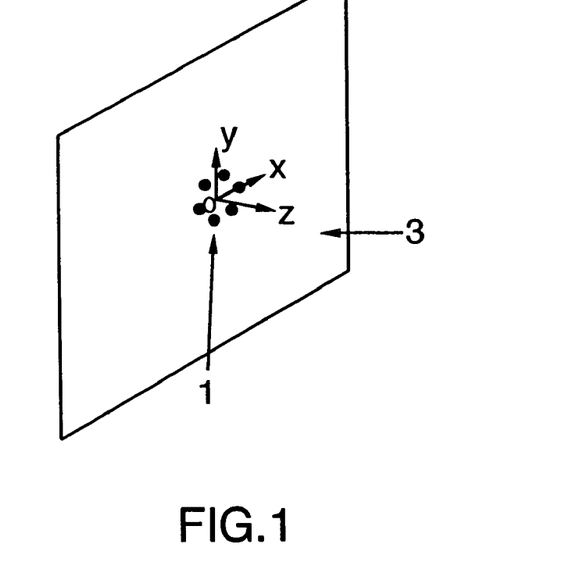
FIG. 1 is a schematic representation of a six-microphone array forming a plane array on a wall.

The simplest embodiment of the inventive beamsteerer is implemented in an audio-video conferencing system as shown in FIG. 1, comprising a planar microphone array 1 on a reflecting plane 3. Ideally, the reflecting plane 3 is a wall toward which most of the participants look during an audio-video conference (e.g. a video screen above which a video camera (not shown) is placed). The microphone spacing is selected to respect the well known λ/2 criterion. The two-dimensional array 1 is capable of providing a unique null in a plane normal to the plane 3 of the array (i.e. in the direction of the speaker in both azimuth and latitude).

Figure 2:
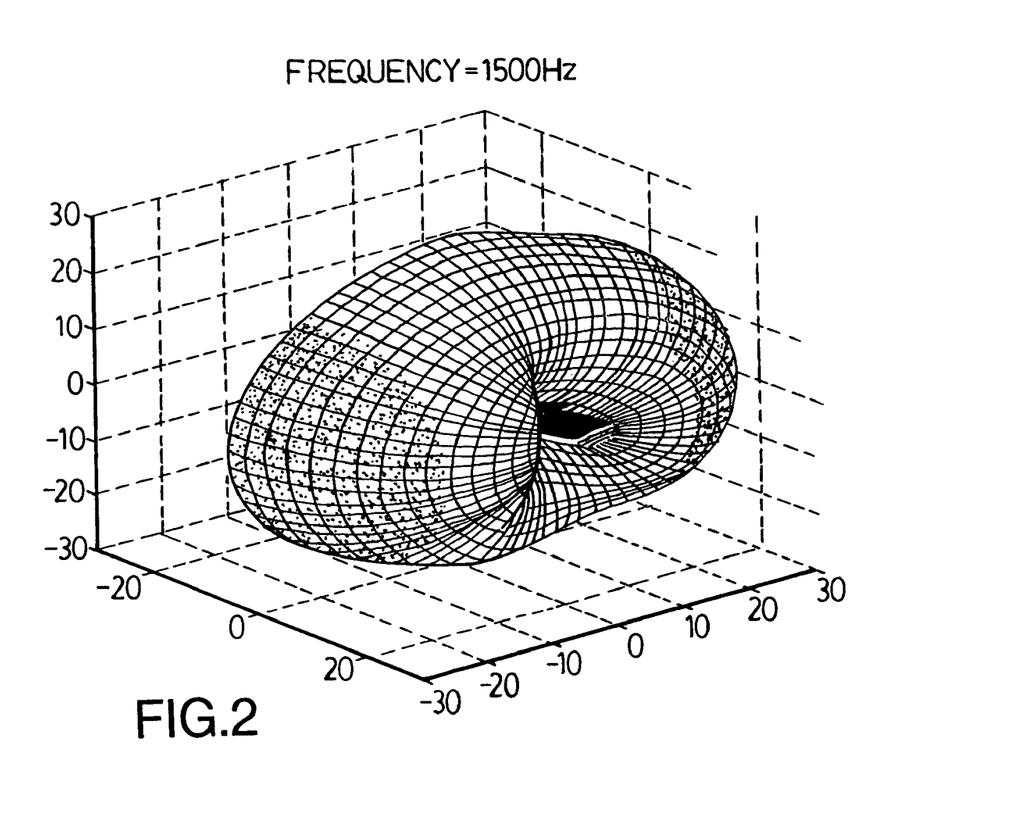
FIG. 2 shows a beam pattern with a steering direction of 90 degrees and one null sector, using the plane microphone array of FIG. 1.

FIG. 2 shows a one-null sector beampattern for a planar array using a source look direction) d(θ,φ)=(90°,0°). A person skilled in the art of sensor arrays and/or beamsteering would understand that (θ,φ) denote spherical coordinates.

Figure 3:
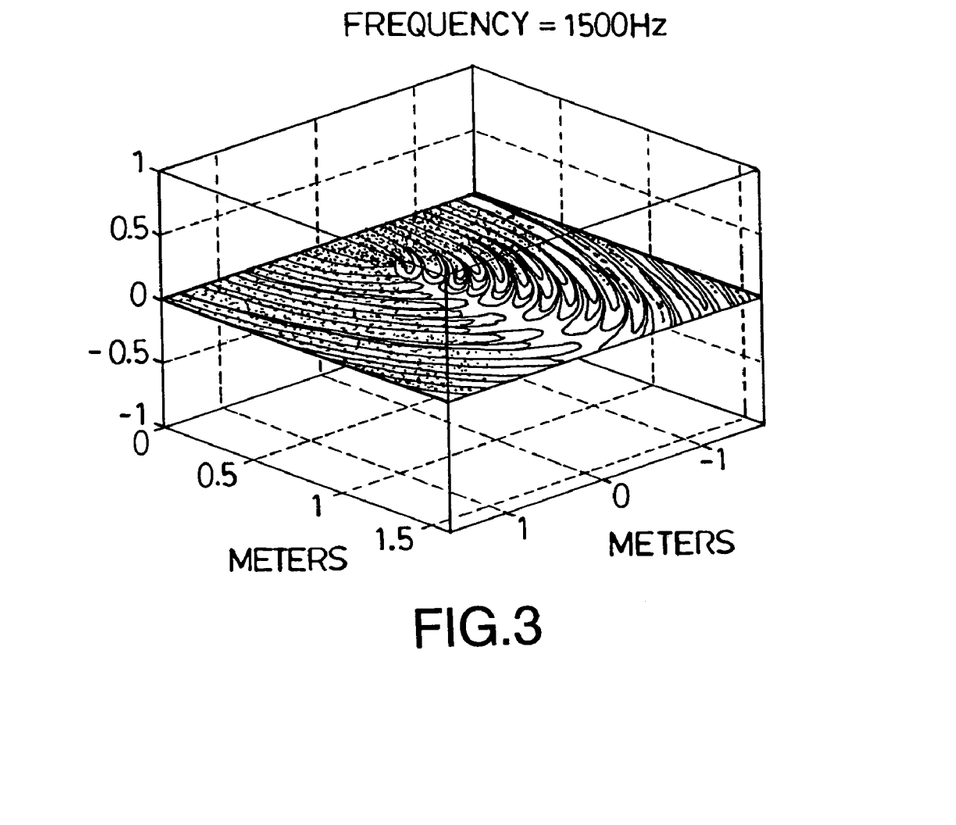
FIG. 3 is a representation of the array gain in the plane XOZ in a domain of 1.6×3.2 meters for the beam pattern designed in FIG. 2.

As illustrated in FIG. 3, which is a representation of the array gain in the plane XOZ in a domain of 1.6×3.2 meters for the beampattern of FIG. 2, this null is very distinct and remains well defined even in close range.

Figure 4:
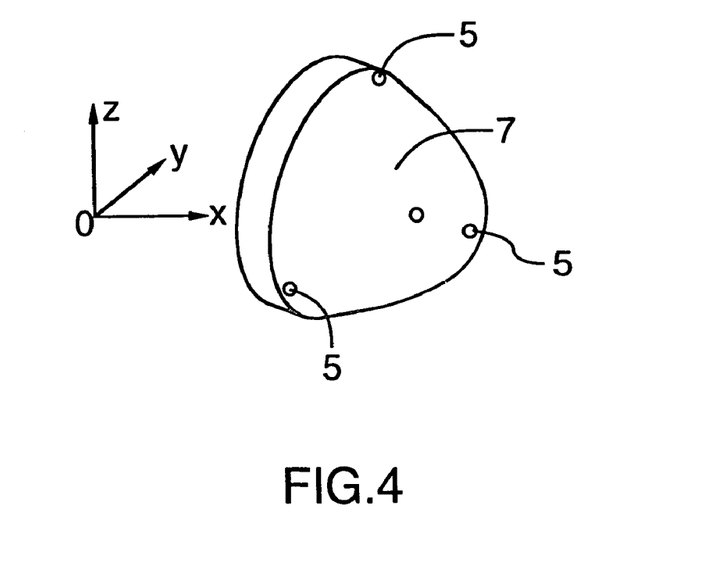
FIG. 4 shows a 3D four-microphone array embedded in an obstacle, for use in free field.

Better results are achieved with a reduced number of microphones in three dimensions, either in free field (over a television set or on a wall) or embedded in an obstacle. The configuration of microphones 5 in an obstacle 7, as shown in FIG. 4, gives rise to several nulls, but they are arranged according to the invention so that they occur behind the source locator. Thus, it is important that no sound sources (computer, fan, etc.) be present in this area.

Figure 5A:
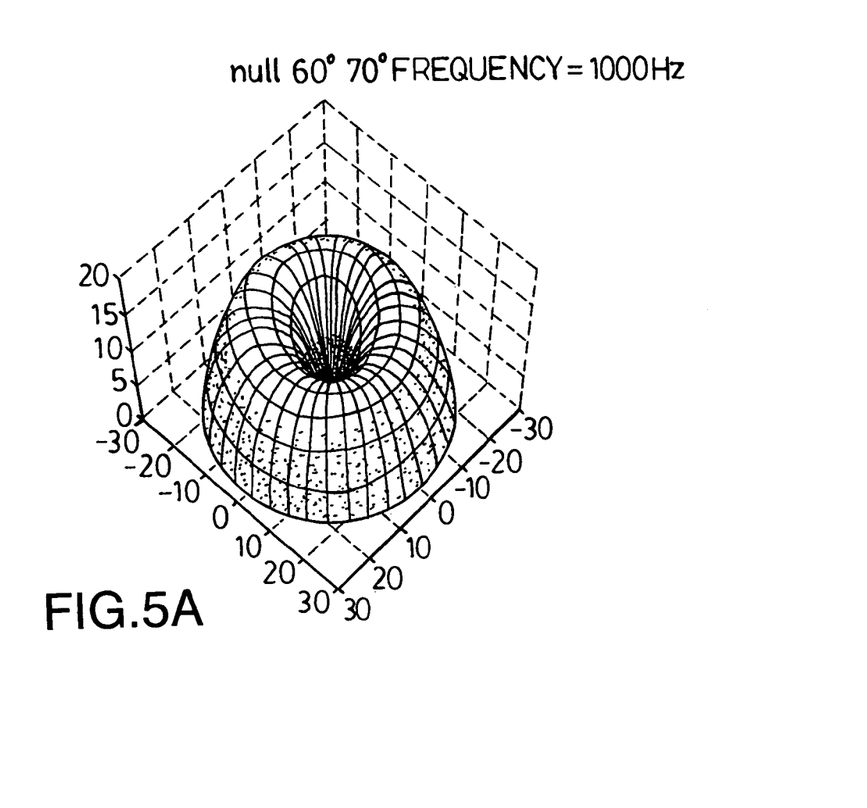
Figure 5B:
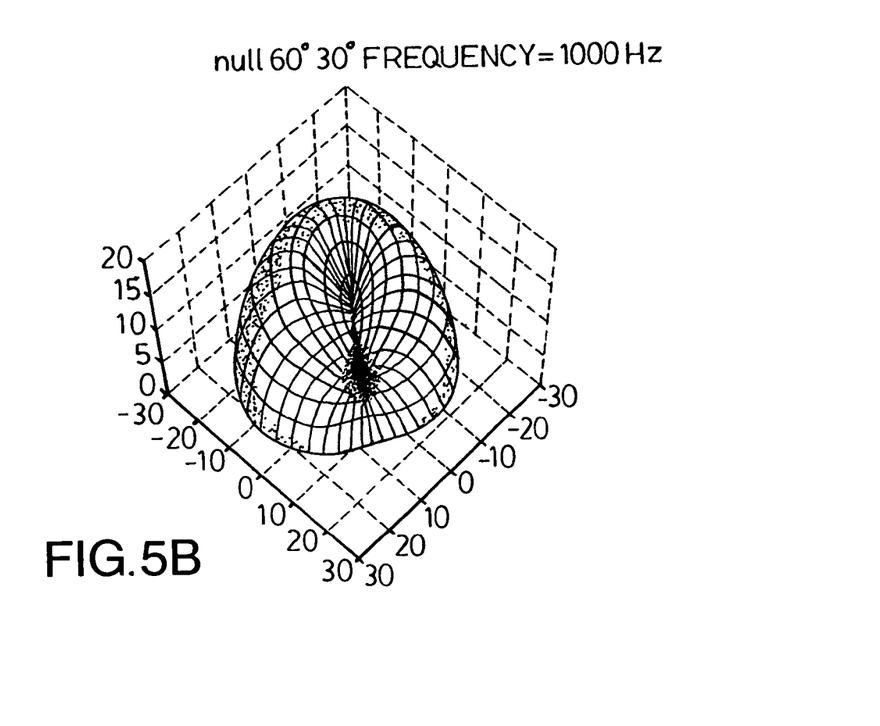

Using a source look direction d(θ,φ)=(70°,0°) the preferred configuration of FIG. 4 results in the beampattern shown in FIG. 5 at ka=0.92, wherein unique null beampatterns are steered in the plane XOY at two different angles, 30 degrees (FIG. 5A) and 70 degrees (FIG. 5B).

The embodiment of FIG. 1, with a plane array 1 over a rigid plane 3 provides a beamformer having dipoles (unique null sector) steered in both vertical and horizontal directions, whereas the three-dimensional array of FIG. 4 is preferable, resulting in a beamformer having a located null. The three-dimensional array can be embedded in an obstacle (FIG. 4) or over a rigid plane, which guarantees the null uniqueness.

Although several embodiments of beamsteerer are possible, only the embodiments of FIGS. 1 and 4 are set forth in detail herein. It would be well within the abilities of a person skilled in the art to design other geometries. Further improvement can be achieved through the use of directional microphones or omni-directional microphones in cavities.

II. Design of the Beampatterns

According to the present invention, a set of N beampatterns are generated, each having a null oriented in a specific direction. In the preferred embodiment, the nulls are located every 10 degrees (from 30 to 150 degrees) in a horizontal and a vertical plane. A person skilled in the art of sensor arrays and/or beamsteering would understand that this may be denoted by θ, φ in spherical coordinates.

Assuming N sectors (horizontal and vertical), building the N beampatterns comprises generating a set of N optimal weight vectors $w_i$ in a frequency band of interest (1000 to 1500 Hz in the preferred embodiment). In this range, the beampatterns can be designed such that they keep the same geometric properties throughout the frequency band (i.e. the same shape and the same null sector width). The beam patterns are designed using a LCMP method, starting with the definition of a conventional minimization problem $$\text{Min}_w \frac{1}{2} w_i^H R_{nn} w_i \text{ subject to } w_i^H d = 0 \quad (1)$$

where d is a microphone signal vector in the null steering direction. The minimization problem is subjected to additional constraints using one or more microphone signal vectors $d_{\theta_i}$ corresponding to different look directions. These constraints are a set of linear constraints $$w_i^H d_{\theta_i} = \alpha_i \quad (2)$$

In this case, equation (1), under constraint, can be written:

$$\text{Min}_w \frac{1}{2} w_i^H R_{nn} w_i \text{ subject to } C^H w_i = g \quad (3)$$

where C is a rectangular matrix defined by:

$$C = [d\ d_{\theta_i} \ldots d_{\theta_N}] \quad (4)$$

and g is a vector defined by:

$$g = \begin{bmatrix} 0 \\ \alpha_1 \\ \vdots \\ \alpha_N \end{bmatrix} \quad (5)$$

The constraint in (3) synthesises the constraints defined in (1) and (2). The weight vector $w_i$ under these conditions is given by:

$$w_i = R_{nn}^{-1} C [C^H R_{nn} C]^{-1} g \quad (6)$$

Figure 6:
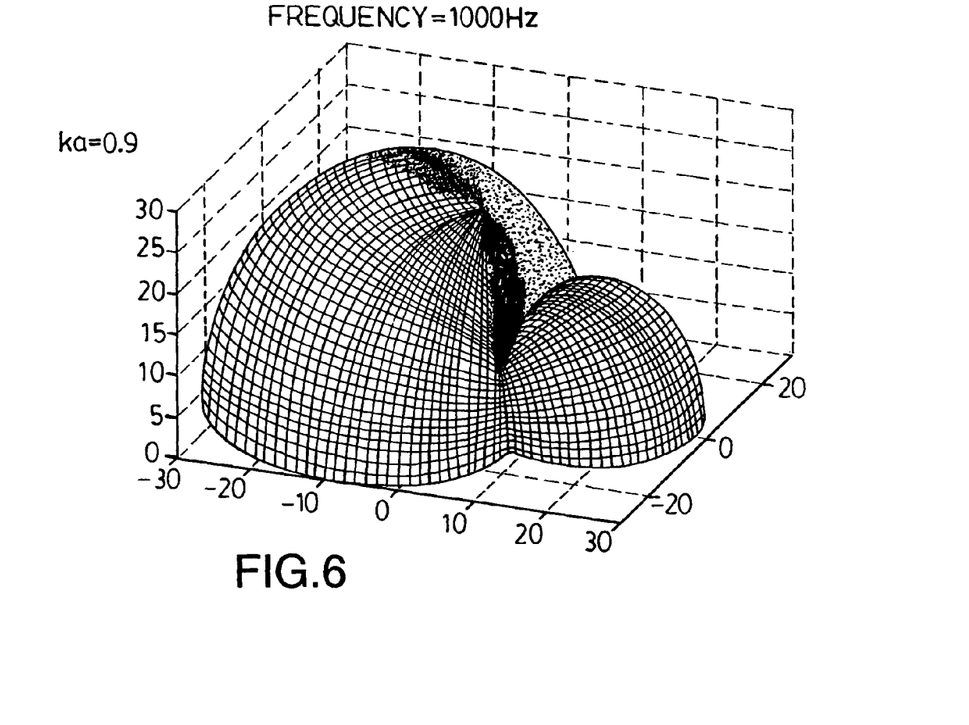
FIG. 6 shows a beam pattern with a null sector at 70 degrees for the microphone array of FIG. 4.
Figure 7:
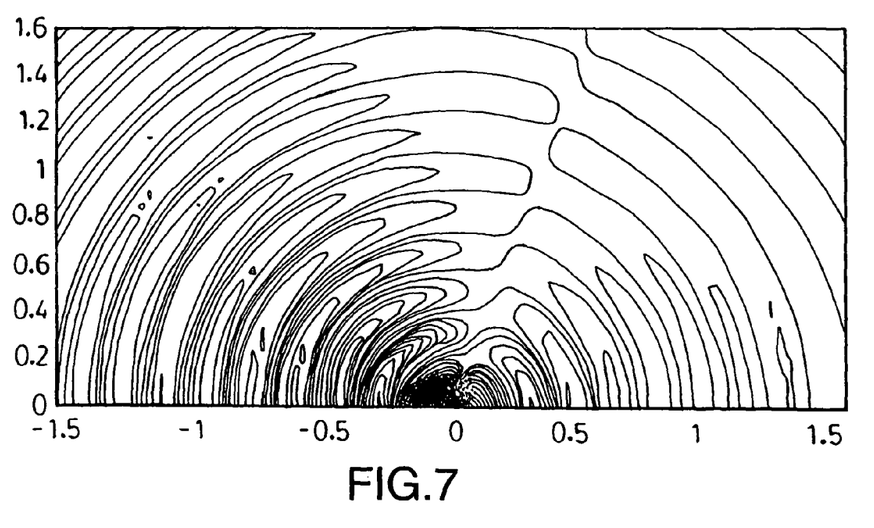
FIG. 7 depicts array gain in the 1.6×3.2 m domain for the beam pattern designed in FIG. 6 with ka=0.92.
Figure 8:
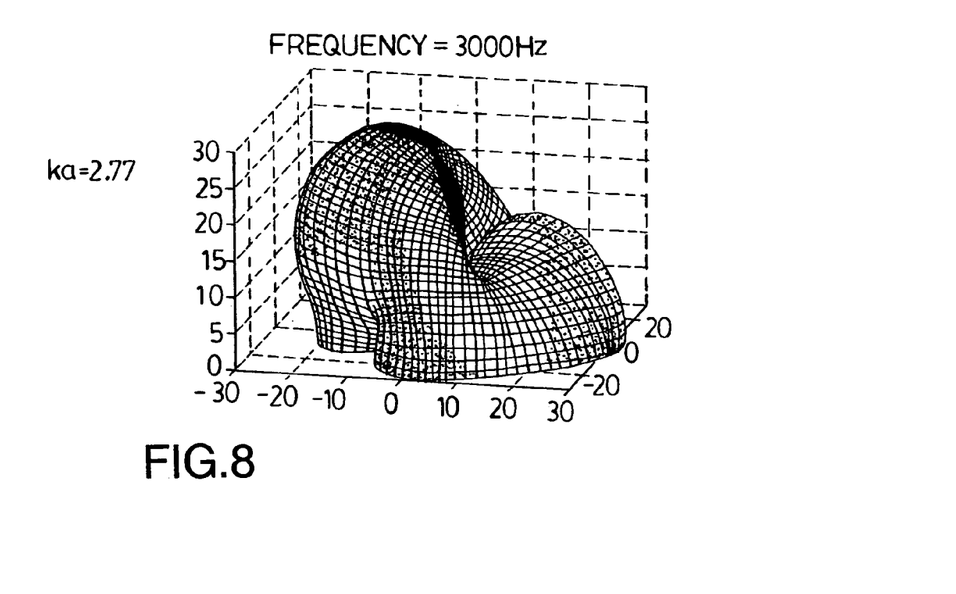
FIG. 8 shows a beam pattern with a null sector at 70 degrees for ka=2.77.
Figure 9:
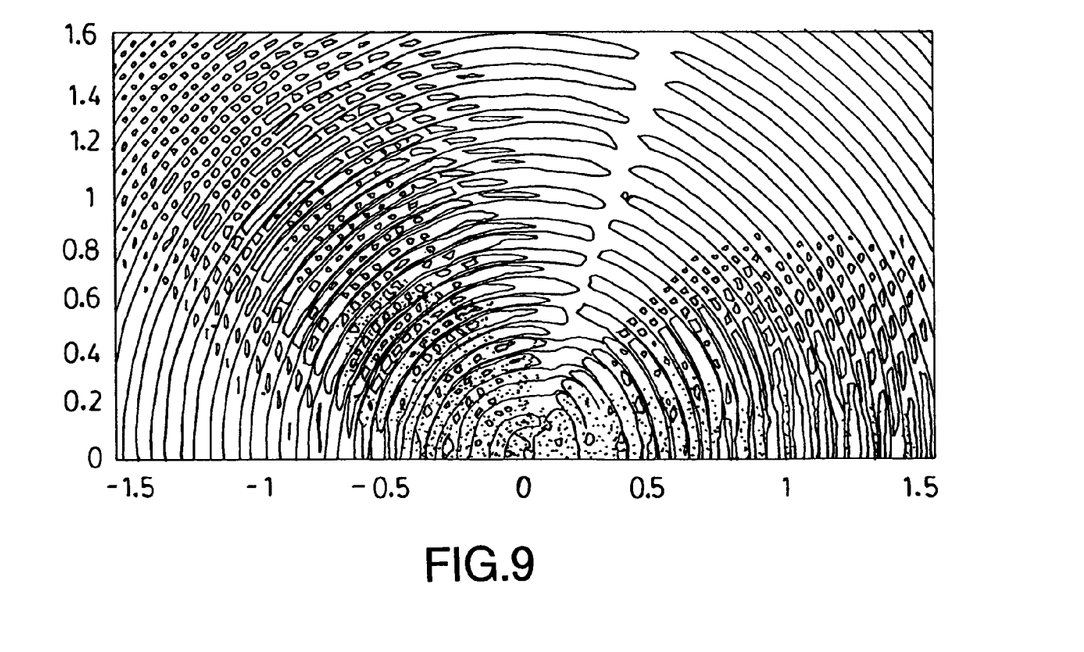
FIG. 9 depicts array gain in the 1.6×3.2 m domain for the beam pattern designed in FIG. 8 with ka=2.77.

The benefit derived from the three dimensional array of FIG. 4, is evident in FIG. 6 (showing a null sector at 70 degrees for ka=0.92), and FIG. 7 (showing the array gain in the 1.6×3.2 m domain for the beampattern of FIG. 6). As expected, the sharpness of the null is increased with frequency (increase in ka). This is evident by comparing FIGS. 6 and 8 and FIGS. 7 and 9, where FIG. 8 shows a null sector at 70 degrees for ka=2.77, and FIG. 9 shows the array gain in the 1.6×3.2 m domain for the beampattern of FIG. 8.

III. Sensitivity to Microphone Errors

The beamsteerer of the present invention can be sensitive to microphone phases and amplitudes errors, and therefore requires calibration, at least in amplitude in a range of about 1 dB. Microphones used in the preferred embodiment can have phase deviation from +/−1.5 degrees at about 400 Hz up to +/−4 degrees at 1600 Hz.

This sensitivity is more important in the case of unique null design than in the case of dipoles. Several ways of overcoming this sensitivity are:

Using a delay and sum beamformer, $R_{nn}=I$. Including the constraints discussed above, the null can be maintained even if its amplitude is less important. It should be noted that the phase and amplitude errors induce an angular error for the source locator. This angle is consistent from one sector to another, making it possible to perform calibration of the source locator with its error.

Increasing the size of the array to avoid redundant information at the microphone. An array of about 20 cm diameter is sufficient at 400 Hz.

Reducing the number of microphones to a minimum.

The regularization technique for the minimization problem affects the steering angle and must therefore be part of the beampattern design.

IV. Source Detection

Detecting the source at a position (θ,φ), requires the computation of the steering index (SI) for each weight vector $w_i$:

$$SI = \frac{1}{|w_i^H d|^p}$$

A person of skill in the art would understand that the formula for SI has the pattern of a linear p-series, and hence would further understand that p is a positive real number (p>0).

The steering index has a very distinct maximum as the beam is steered at the source. In the preferred embodiment, the steering index is used as an input signal to point the beamsteerer to a video. The array is ideally also coupled to a voice activity detector, which can detect a source using only one microphone or in conjunction with the microphone array steering a beam (rather than a null) to detect a valid signal, as is known in the art.

Figure 10A:
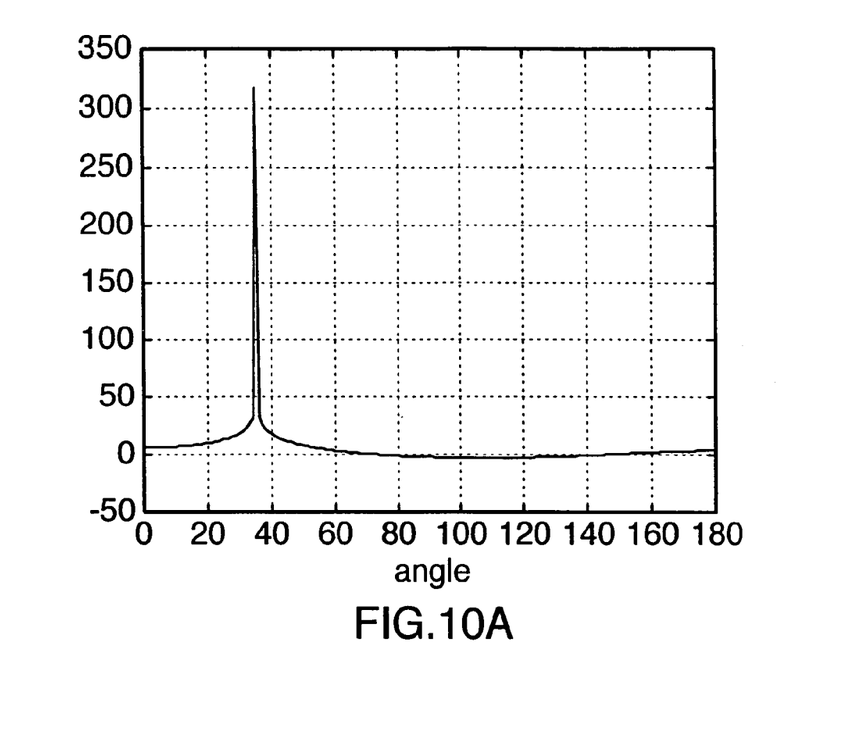
Figure 10B:
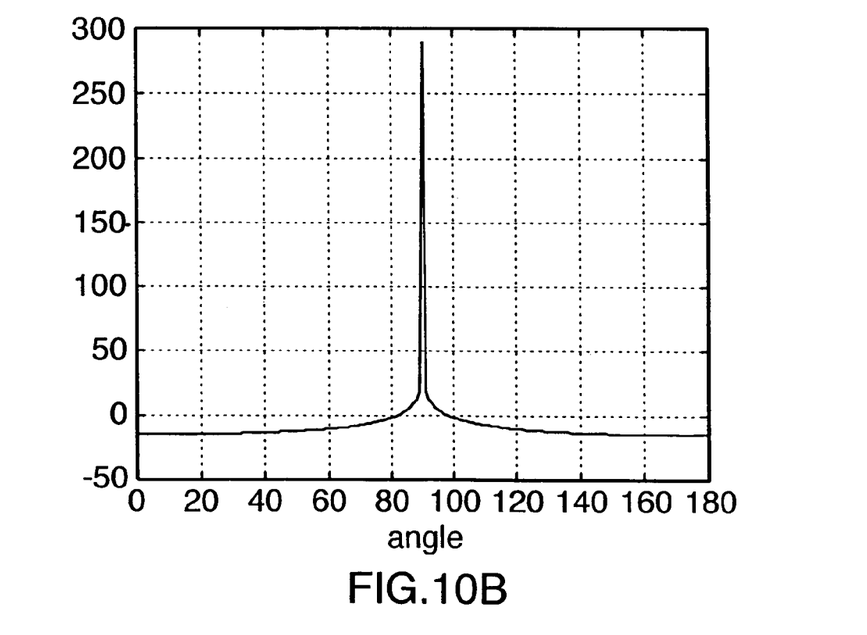

As explained in Section III, above, the beamsteerer of the present invention is quite robust to phase and amplitude errors. FIG. 10 is a plot of $\log_{10}(SI)$ for two sources at 35 degrees (FIG. 10A) and 90 degrees (FIG. 10B) at 1 meter from the center of the array, where the microphones are assumed to be perfect (ka=1.85). The resulting SI performance shows no errors.

Figure 11A:
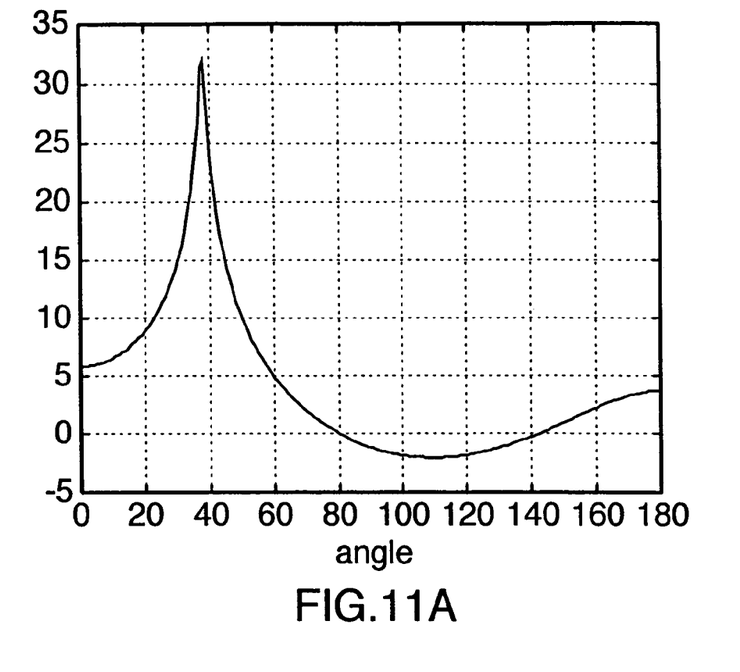
Figure 11B:
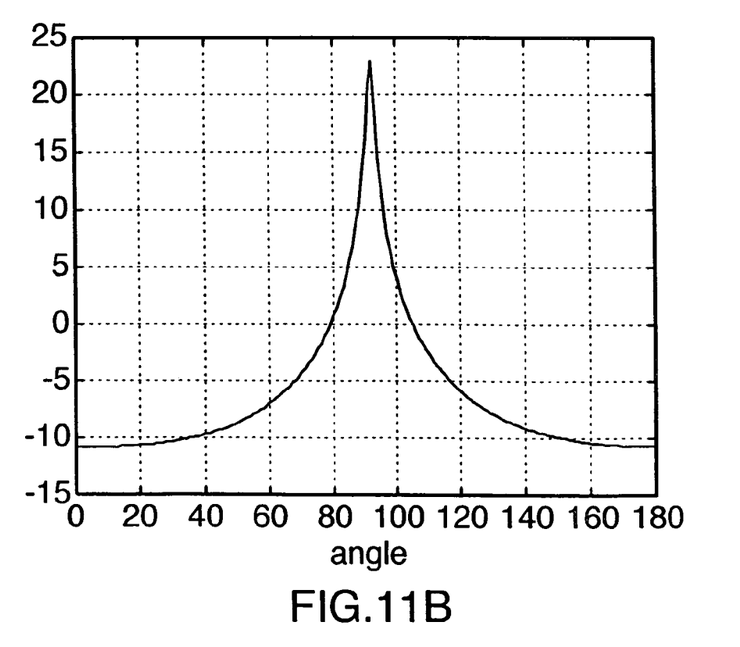

FIG. 11 is the same plot of SI performance as FIG. 10, but with microphone induced amplitude errors of +/−1 dB and phase errors of +/−4 degrees. It will be noted that there is some loss of selectivity and a consistent two-degree shift up for both sectors, when compared to FIG. 10. Nonetheless, by limiting the errors a very usable implementation is possible.

Figure 12A:
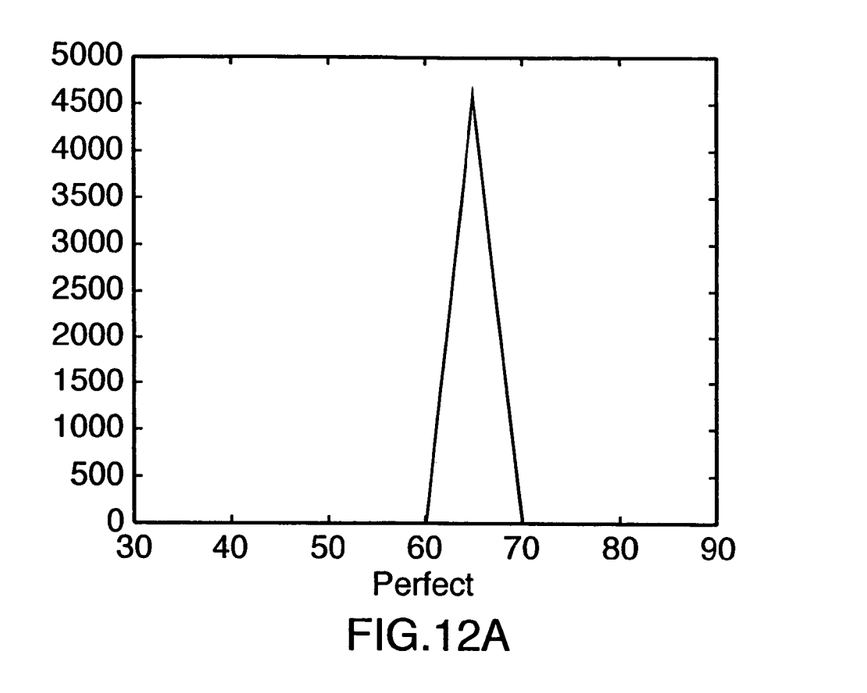
FIG. 12 is a $\log_{10}(SI)$ graph similar to FIG. 11 for a source at 65 degrees and 1 meter from the center of the array, where ka=0.92.
Figure 12B:
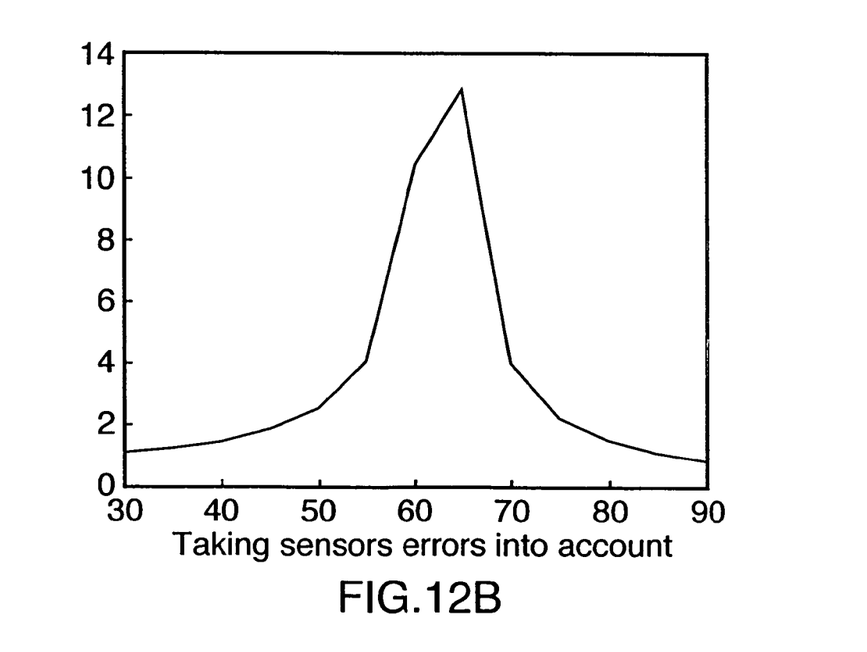

FIG. 12 illustrates the output from the SI detector for a source at 65 degrees and 1 meter from the center of the array. The detection still works in spite of microphone errors of about 8 degrees in phase and +/−1 dB in amplitude. The SI is calculated and plotted at every possible location (in this case every 5 degrees). In the first instance (FIG. 12A) the ideal beam shape is used and the detection is very sharp. In the second case (FIG. 12B) errors are introduced yet the detection remains reasonably clear. The effect of the two-degree shift is evident, as the peak is not symmetric about 65 degrees. Even without correction for this effect a very sharp transition is seen.

Variations and alternative embodiments will be understood by a person of skill in the art. Indeed, there may be significant variations for applications of the invention to different sensor systems (e.g. RF, Sonar, etc.) All such embodiments and variations are believed to be within the sphere and scope of the present invention as defined by the claims appended hereto.

We claim:

1. A beamsteerer for locating a source of desired non-noise audio, the beamsteerer comprising:
    an array of sensors, each of said sensors having a signal vector d within one of N sectors in a domain of interest; and
    a beamformer for receiving and multiplying each said signal vector d by a set of N weight vectors $w_i$ in said domain of interest to generate a plurality of beampatterns in said N sectors, each of said beampatterns being characterized by a null having high angular resolution, and detecting said source at a position (θ,φ), of lowest energy in said domain of interest, by selecting a maximum steering index (SI) where $$SI = \frac{1}{|w_i^H d|^p},$$

wherein p is a positive real number.

2. The beamsteerer of claim 1, wherein sensors are arranged in two-dimensions on a reflecting plane.

3. The beamsteerer of claim 2, wherein each of said sensors is a microphone.

4. The beamsteerer of claim 2, further comprising a voice activity detector connected to said beamformer for detecting voice activity to thereby distinguish human voice from noise.

5. The beamsteerer of claim 2, wherein detection of said source is used to steer on of either a video camera or a directional microphone or microphone array.

6. The beamsteerer of claim 1, wherein said sensors are arranged in three-dimensions in free field.

7. The beamsteerer of claim 6, wherein each of said sensors is a microphone.

8. The beamsteerer of claim 6, further comprising a voice activity detector connected to said beamformer for detecting voice activity to thereby distinguish human voice from noise.

9. The beamsteerer of claim 6, wherein detection of said source is used to steer one of either a video camera or a directional microphone or microphone array.

10. The beamsteerer of claim 1, wherein said sensors are arranged in three-dimensions on an obstacle.

11. The beamsteerer of claim 10, wherein each of said sensors is a microphone.

12. The beamsteerer of claim 10, further comprising a voice activity detector connected to said beamformer for detecting voice activity to thereby distinguish human voice from noise.

13. The beamsteerer of claim 10, wherein detection of said source is used to steer one of either a video camera or a directional microphone or microphone array.

14. The beamsteerer of claim 1, wherein each of said sensors is a microphone.

15. The beamsteerer of claim 1, further comprising a voice activity detector connected to said beamformer for detecting voice activity to thereby distinguish human voice from noise.

16. The beamsteerer of claim 1, wherein detection of said source is used to steer one of either a video camera or a directional microphone or microphone array.

* * * * *